United States Patent [19]

Sines et al.

[11] Patent Number: 4,527,648
[45] Date of Patent: Jul. 9, 1985

[54] BATTERY-POWERED WHEELED VEHICLE

[76] Inventors: Thomas E. Sines; Yvette L. Chermey, both of 1400 NW. 33rd St., Apt. #38, Pompano Beach, Fla. 33064

[21] Appl. No.: 532,689

[22] Filed: Sep. 16, 1983

[51] Int. Cl.³ .............................................. B62D 11/04
[52] U.S. Cl. ..................... 180/6.5; 180/216; 180/217; 180/907; 280/242 WC; 301/67
[58] Field of Search ................ 180/6.5, 210, 215, 216, 180/217, 907; 280/211, 242 WC; 301/104, 67, 75, 57, 58, 59

[56] References Cited

U.S. PATENT DOCUMENTS

| 308,862 | 12/1984 | Valiquet . | |
|---|---|---|---|
| 353,935 | 12/1886 | Gibbons et al. . | |
| 727,405 | 5/1903 | Modisett . | |
| 776,382 | 11/1904 | Brownson | 301/75 |
| 1,450,064 | 3/1923 | Dodds | 301/57 |
| 1,808,748 | 6/1931 | Apple . | |
| 2,798,565 | 7/1957 | Rosenthal et al. | 180/6.5 |
| 3,183,020 | 5/1965 | Hawyer | 280/208 |
| 3,301,574 | 1/1967 | Good | 280/211 |
| 3,563,568 | 2/1971 | Sasse | 280/242 WC X |
| 3,566,165 | 2/1971 | Lohr | 310/67 |
| 3,786,887 | 1/1974 | Rosenthal et al. | 180/6.5 |
| 3,955,639 | 5/1976 | Cragg | 180/6.5 |
| 3,994,509 | 11/1976 | Schaeffer | 280/242 WC |
| 4,037,676 | 7/1977 | Ruse | 180/6.5 |
| 4,157,123 | 6/1979 | Rodaway | 180/6.5 |
| 4,199,036 | 4/1980 | Wereb | 180/6.5 |
| 4,273,350 | 6/1981 | Williams | 280/242 WC |

FOREIGN PATENT DOCUMENTS 2248678 5/1975 France ............................... 180/907

Primary Examiner—Joseph F. Peters, Jr.
Assistant Examiner—Charles R. Watts
Attorney, Agent, or Firm—Oltman and Flynn

[57] ABSTRACT

A vehicle having the driver's seat between two large diameter wheels, each having a series of circumferentially spaced cables under tension between a rigid circumferential ring, which carries a tire, and the opposite ends of a central hub. A driver's seat is located between the wheels and batteries and separate electric motors and speed reduction drives for the wheels are below this seat. Control handles on opposite sides of the driver's seat have switches for controlling the speed of each wheel. Each wheel has a caliper-type bicycle brake.

5 Claims, 9 Drawing Figures

BATTERY-POWERED WHEELED VEHICLE

SUMMARY OF THE INVENTION

This invention relates to a battery-powered vehicle having two large diameter ground wheels on opposite sides of a driver's seat.

In accordance with this invention, the driver's seat is supported between the ground wheels by a frame which supports batteries and electric motors below the driver's seat. Each ground wheel is driven individually through a speed reduction drive from its own motor under the control of one or more switches operated from a control handle on the same side of the driver's seat as that wheel. A hand brake for each wheel is operated from the corresponding control handle. Preferably, the speed reduction drive between each motor and the corresponding ground wheel includes a conventional bicycle wheel rim, and the hand brake for that ground wheel is a conventional caliper-type bicycle brake which is engageable with that bicycle wheel rim to stop the drive from the motor to the ground wheel.

A principal object of this invention is to provide a novel battery-powered wheeled vehicle which is both safe and fun to drive.

Another object of this invention is to provide such a vehicle which combines stability and manueverability.

Further objects and advantages of this invention will be apparent from the following detailed description of a presently preferred embodiment which is illustrated schematically in the accompanying drawings.

DESCRIPTION OF THE DRAWINGS

FIG. 8 is a fragmentary vertical cross-section taken at the inner side of the left wheel of the vehicle; and FIG. 9 is a schematical electrical circuit diagram of the batteries, motors and switches in this vehicle.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Figure 3:
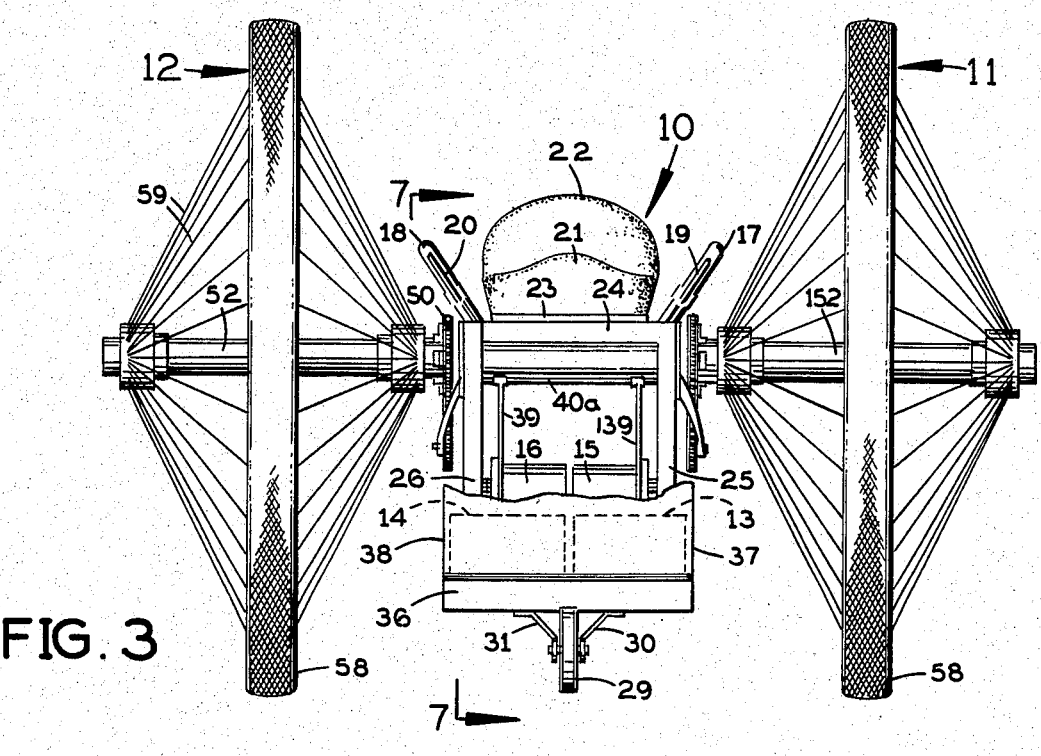
FIG. 3 is a front elevation.
Figure 4:
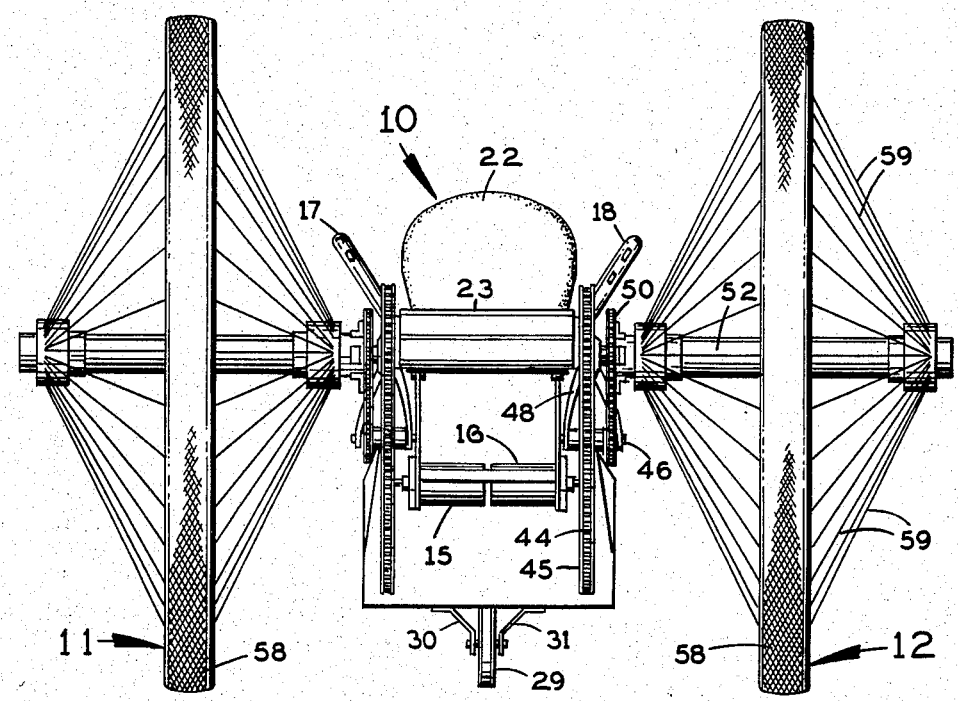
FIG. 4 is a rear elevation.

Referring first to FIG. 3, in broad outline the present vehicle has a driver's seat 10 located midway between a ground-engaging left wheel 11 and a ground-engaging right wheel 12, storage batteries 13 and 14 below the driver's seat, and separate electric motors 15 and 16 above the batteries and below the driver's seat for driving the ground wheels individually through separate speed-reducing drives. Control handles 17 and 18 in front and on opposite sides of the driver's seat contain switches which control the motors. Hand-operated brake actuators 19 and 20 for individual brakes on the wheels 11 and 12 are located at the control handles.

Figure 7:
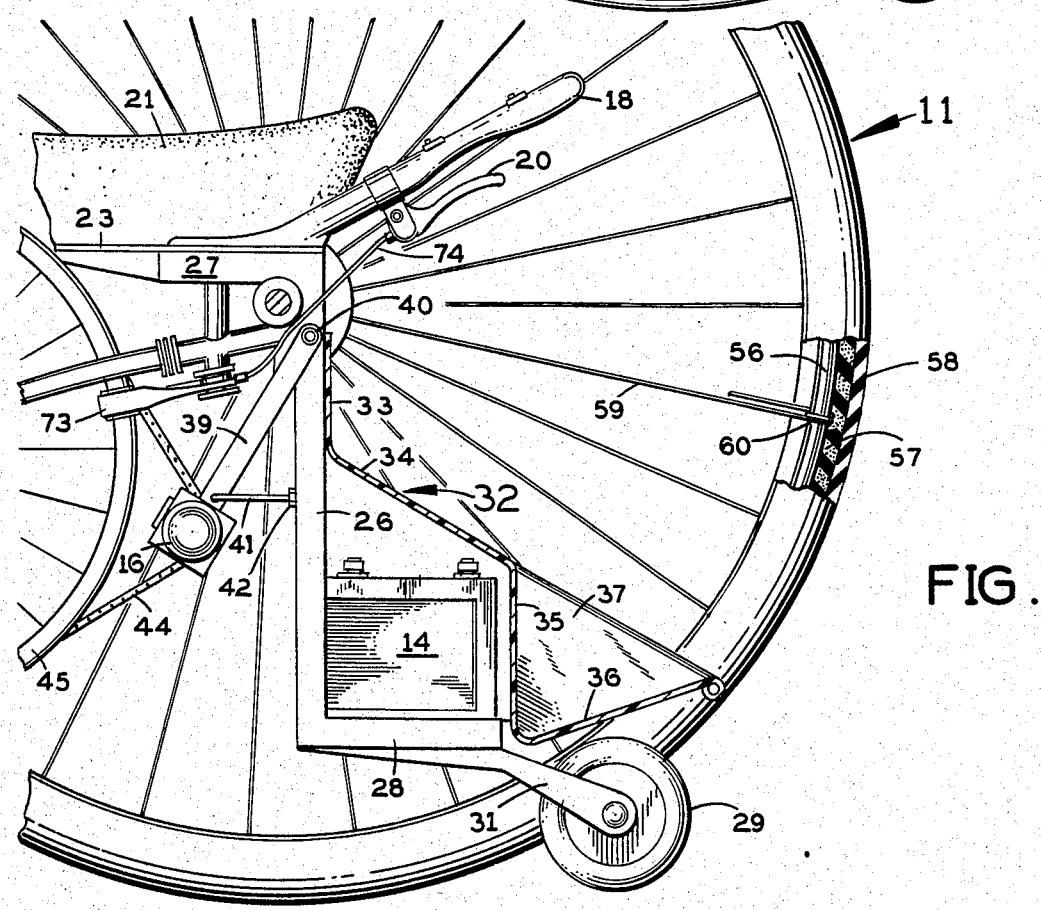
FIG. 7 is a fragmentary vertical longitudinal section taken along the line 7—7 in FIG. 3.

The seat 10 has a cushioned bottom 21 with a cross-sectional profile as shown in FIG. 3 and a short back rest 22 (FIGS. 1 and 2) extending up behind the bottom 21. The seat is attached to the top of a flat horizontal base plate 23 mounted on a rigid frame having a top cross piece 24 (FIG. 3) directly below plate 23 and downwardly extending opposite side pieces 25 and 26. These side pieces are located below the front end of the seat bottom 21, as shown in FIG. 7 for the side piece 26. The upper end of side piece 26 is joined to a horizontal rearwardly extending arm 27 extending directly beneath base plate 23 along its right edge. The other side piece 25 of the frame is similarly joined at its upper end to a similar horizontal arm extending rearwardly below the base plate 23 along its left edge. The frame has a bottom wall 28 (FIG. 7) extending horizontally between and forward from the lower ends of its side pieces 25 and 26.

Figure 6:
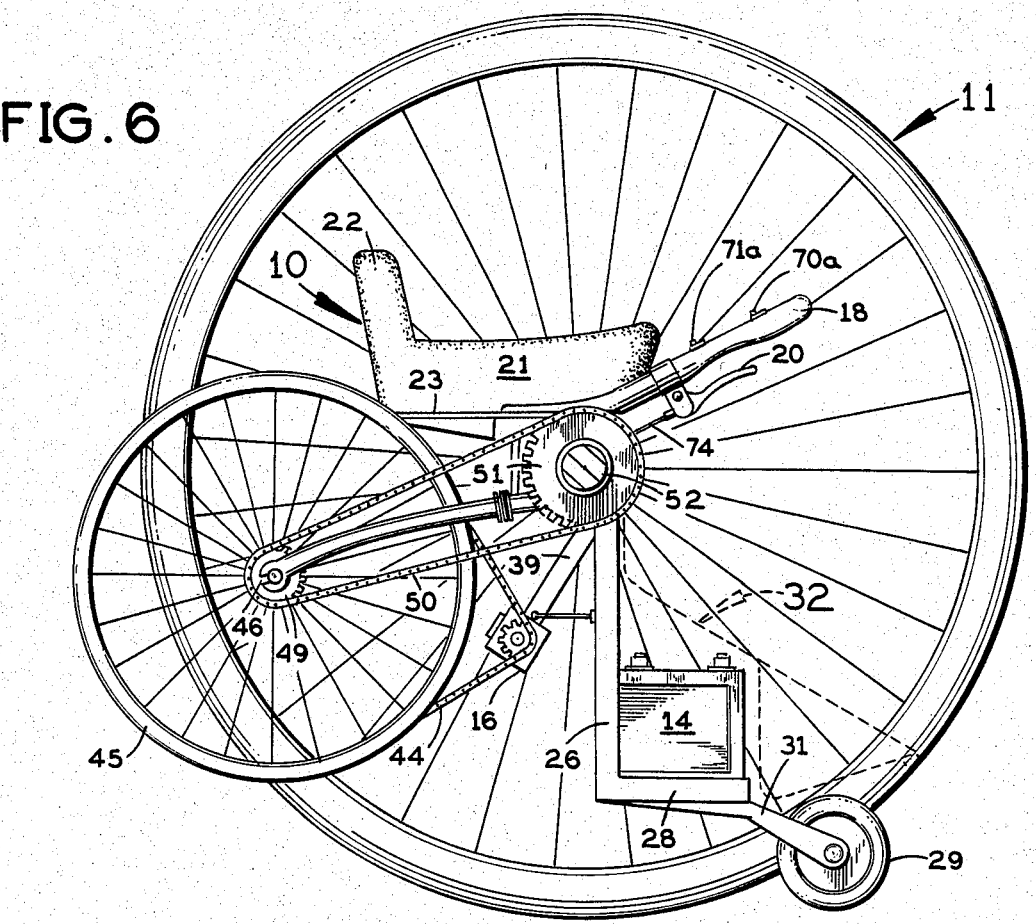
FIG. 6 is a vertical longitudinal section taken along the line 6—6 in FIG. 2.

A small wheel 29 (FIG. 3), located midway between wheels 11 and 12, is rotatably supported by brackets 30 and 31 attached to the bottom of the frame's bottom wall 28 and extending forward and downward from it. When the driver is sitting in a normal driving position on the seat 10, the small central wheel 29 will be slightly off the ground, as shown in FIG. 6. If the driver leans forward, or when he or she is getting on or off the seat, his or her weight will tilt the rigid assembly of the seat and the frame far enough to lower wheel 29 into engagement with the floor or the ground.

Figure 1:
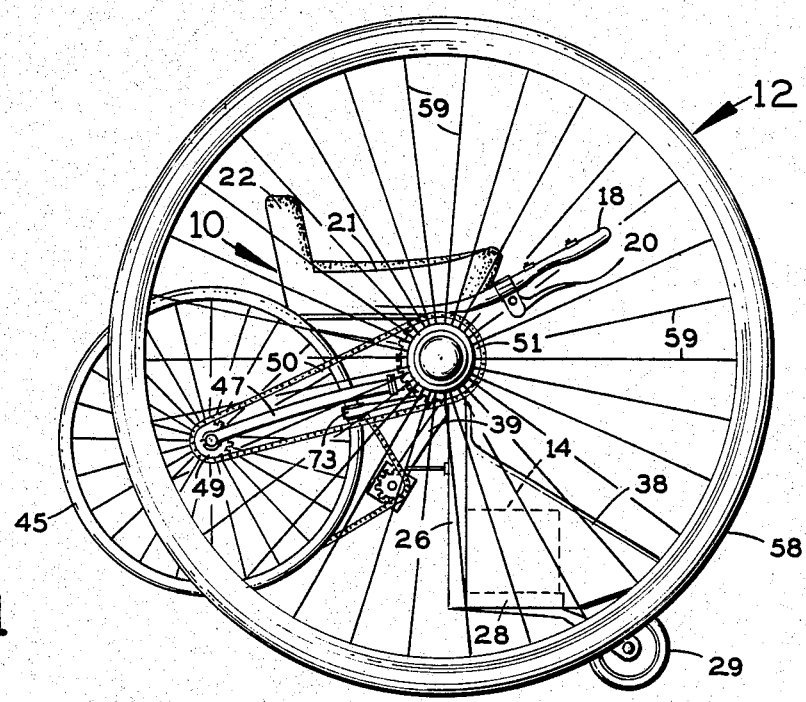
FIG. 1 is a side elevation of a vehicle in accordance with this invention.
Figure 2:
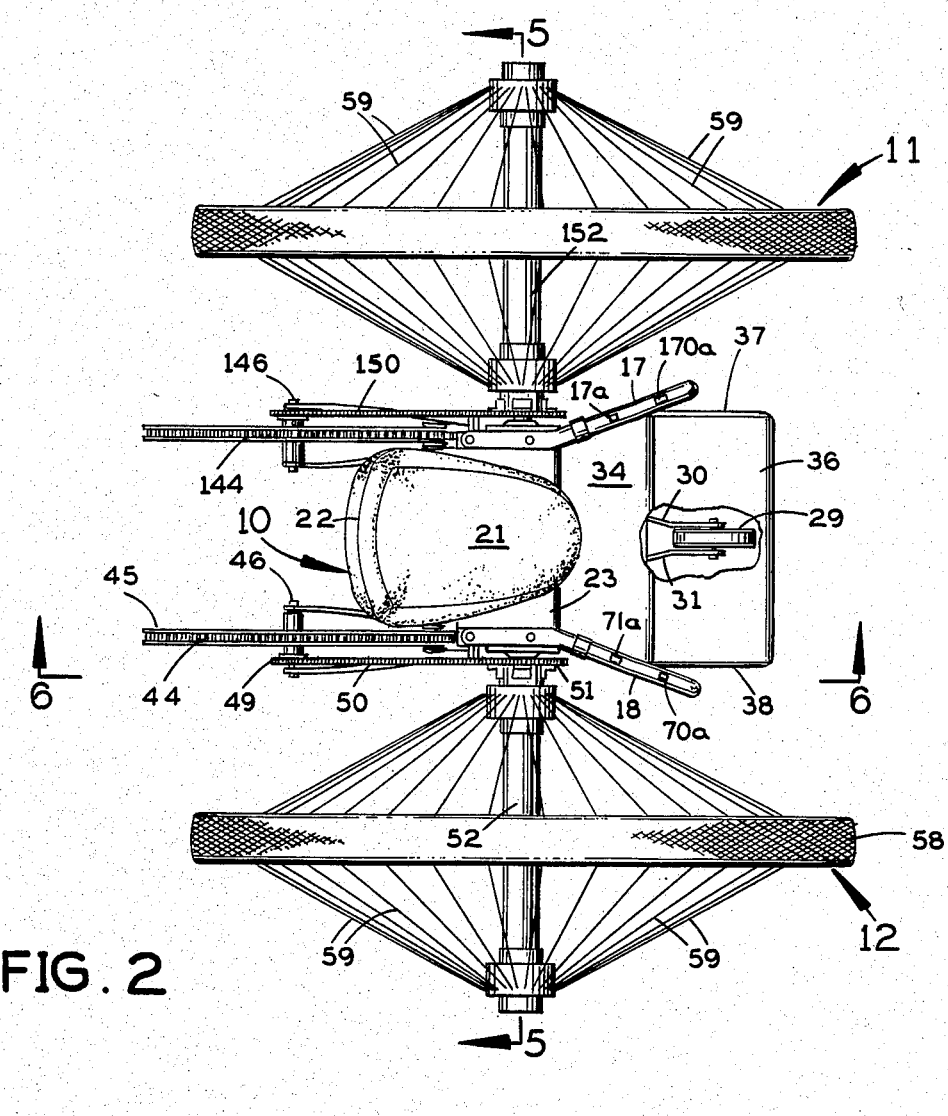
FIG. 2 is a top plan view of the vehicle.

The two batteries 13 and 14 are positioned directly on top of the bottom wall 28 of the frame below and behind a cover plate 32 (FIG. 7). This cover plate has a vertical upper end segment 33 extending laterally between and attached to the side pieces 25 and 26 of the frame at the front, a downwardly and forwardly inclined segment 34 extending across the top of the batteries, a vertical front segment 35 extending down in front of the batteries, and a forwardly and upwardly inclined foot-rest segment 36 at the bottom a short distance above the small central wheel 29. The cover plate also has opposite vertical sides 37 and 38 (FIGS. 1, 2 and 7).

As shown in FIG. 7, the motor 16 for driving the right wheel 12 is on the lower end of a rigid arm 39 which is inclined downward and rearward from a pivoted connection at 40 to the frame which supports the driver's seat and the batteries. As shown in FIG. 3, this pivotal connection is provided by a horizontal shaft 40a extending laterally between the side pieces 25 and 26 of the frame and passing through a complementary opening in arm 39 near its upper end. Just above motor 16 the arm is pivotally engaged by the back end of a rod 41 having a screw-threaded front end received in a nut 42 mounted on the back of frame side piece 26. By turning rod 41 in nut 42, the fore-and-aft position of motor 16 can be adjusted.

Figure 5:
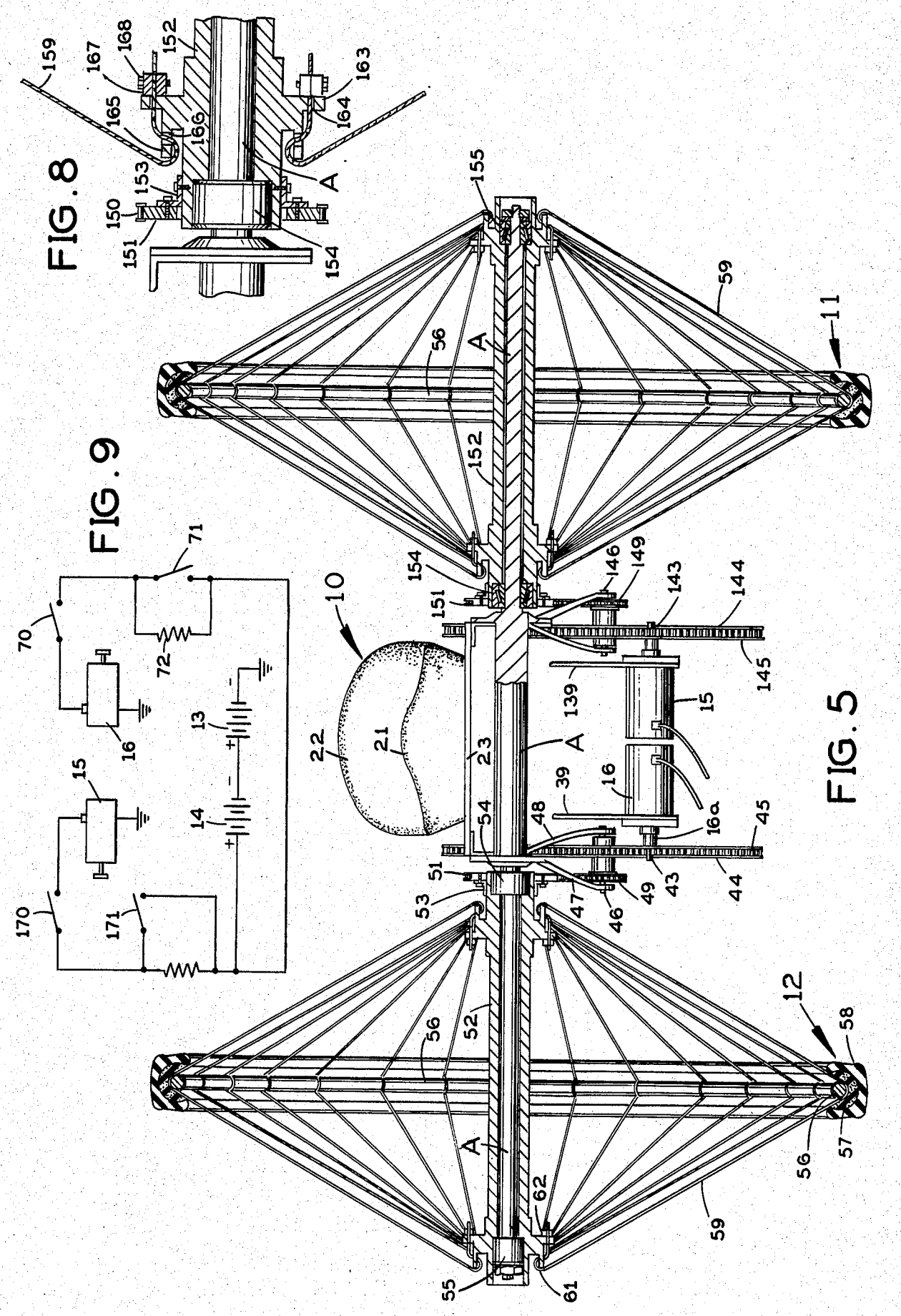
FIG. 5 is a vertical cross-section taken along the line 5—5 in FIG. 2.

As shown in FIG. 5, the output shaft 16a of motor 16 carries a small diameter sprocket 43 which drives an endless chain 44. As shown in FIG. 6, chain 44 extends around a larger diameter wheel 45 located behind motor 16 and rotatably mounted on a horizontal shaft 46 (FIG. 2) which is suspended from the frame by support arms 47 and 48 at its opposite ends.

Wheel 45 is the rim of a conventional bicycle (e.g., 26 or 28 inches in diameter) with the tire removed. By means of rod 42 the position of motor 16 longitudinally of the vehicle is adjusted to provide a proper tension on chain 44 so that it will drive wheel 45 with substantially no slippage between them.

The large diameter wheel 45 is rigidly connected coaxially to a small diameter sprocket 49 (FIGS. 1 and 2) which drives a second endless chain 50 extending forward and upward from sprocket 49 and passing around a larger diameter sprocket 51. As shown in FIG. 5, sprocket 51 is fastened to the hub 52 of wheel 12 by right-angled brackets 53 bolted to each of them. This arrangement of sprocket 43, chain 44, wheel 45, sprocket 49, chain 50 and sprocket 51 provides a speed reduction drive between motor 16 and ground wheel 12.

An identical drive arrangement connects the other electric motor 15 to the left wheel 11. Corresponding elements of this drive arrangement are given the same reference numerals plus 100 as those just described for the drive from motor 16 to wheel 12.

Both wheel hubs 52 and 152 are rotatably supported by a single horizontal axle A, which is rigidly mounted on the frame which supports the seat 10 and the batteries 13 and 14. As shown in FIG. 5, axle A passes through this frame a short distance below the base plate 23 for the driver's seat. Roller bearings 154 and 155 are engaged between axle A and the left wheel hub 152 at each end of the latter to support the left wheel for rotation on the axle. Similar bearings 54 and 55 support the right wheel hub 52 on axle A.

As shown in FIG. 5, the right wheel 12 has a circular steel ring 56 covered on the outside by a deformable and resilient, relatively thick layer 57 of sponge rubber and a hard rubber tire 58, both of which extend about ⅔ of the way around the steel ring viewed in cross-section. A plurality of steel cables 59 extend between the steel ring 56 and the opposite ends of the wheel hub 52. These cables are evenly spaced apart circumferentially of the wheel. As shown in FIG. 7, each cable 59 is wrapped in a single turn at 60 around the ring 56. As shown in FIG. 5, at the axially outboard end of the wheel hub 52 each cable 59 is adjustably clamped to the wheel hub 52 in such a manner that the tension on the cable can be adjusted selectively here. The opposite end of each wheel cable 59 is adjustably clamped to the wheel hub 52 near its axially inboard end in the same manner.

FIG. 8 shows in detail this adjustable clamp arrangement for the cables 159 on the axially inboard end of the left wheel 11, which is of identical construction to wheel 12. As shown in FIG. 8, the wheel hub 152 for the left wheel 11 has a radially outwardly protruding circumferential flange 163 with a plurality of circumferentially spaced openings 164, one for each cable 159. This wheel hub also has a cylindrical flange 165 facing axially inward and spaced a short distance axially inward from the radial flange 163. Flange 165 is formed with a plurality of openings 166, one for each cable 159, each of which is aligned with a corresponding opening 164 in radial flange 163. Each cable 159 extends around the inside of the corresponding cylindrical flange 165 and passes through the opening 166 and then axially outward through the corresponding opening 164 in the corresponding radial flange 163. A cable clamp 167 of known design grips the cable and abuts against the axially outward side of radial flange 163. A bolt 168 on the clamp may be turned in one direction to tighten it on the cable or in the opposite direction to loosen the clamp and enable the cable to be adjusted in either direction. In this way the user can adjust the tension on each cable 159 in the wheel.

The right wheel 12 has the same cable adjusting arrangement.

Preferably, the cable tension on all the cables in both wheels is adjusted to the same pitch, such as 440 Hz., as determined by a tuning fork.

Each wheel has suitable covers (not shown) extending between the hub and the outer ring to prevent the cables from producing readily audible sound.

FIG. 9 shows schematically one form of electrical control circuit for controlling the drive to each wheel. The electrical motor 16 which drives the right wheel 12 is connected across the series-connected batteries 13 and 14 through a manual on/off switch 70 and a manual speed control switch 71 in parallel with a resistor 72. When switch 71 is closed, the full battery voltage is appled to motor 16 for high speed operation when the on/off switch 70 is closed. When switch 71 is open, resistor 72 is connected in series with switch 70 to reduce the voltage applied to motor 16, so that the corresponding wheel is driven at a slower speed.

The energization of motor 15 is controlled in the same fashion through an on/off switch 170, a speed control switch 171 and a resistor 172 connected across the speed control switch.

The driver can control the vehicle's speed and its direction (straight ahead, left turn or right turn) by operating the on/off switches 70 and 170 and the speed control switches 71 and 171.

Referring to FIG. 6, the handle 18 on the right hand side of the driver's seat carries push buttons 70a and 71a for operating switches 70 and 71, respectively. Similarly, the handle 17 on the left hand side of the driver's seat carries individual push buttons for switches 170 and 171.

As shown in FIG. 7, the chain-driven wheel 45 in the drive between electric motor 16 and the right wheel 12 is provided with a caliper brake 73 of a known type commonly used on bicycle wheels. A flexible cable 74 for applying this brake extends up to handle 20 pivotally mounted just below the right hand control handle 18. When the upper front end of brake-actuating handle 20 is moved up toward control handle 18, brake 73 is applied against wheel 45, thereby disconnecting the drive from motor 16 to wheel 12.

An identical hand brake is provided on the wheel 149 in the drive from motor 15 to wheel 11. This brake is actuated by a handle 19 pivoted below the left hand control handle 17 and coupled to a caliper brake on wheel 149 through a flexible cable.

OPERATION

In one practical embodiment, each of the ground wheels 11 and 12 is about 40 inches in diameter and the driver's seat 10 is at a low enough elevation between these wheels that the driver is substantially protected on each side by the wheels. Each electric motor 15 or 16 drives the corresponding ground wheel 11 or 12 individually and each hand-operated brake 49 or 149 controls the drive to an individual ground wheel. This speed at which each ground wheel 11 or 12 is driven by the corresponding electric motor is controlled by the switches operated from the corresponding control handle 17 or 18 on the same side of the driver's seat. The vehicle is highly maneuverable in response to the driver's manual control over which motor or motors are energized, and at what speed, and which hand brake is applied. The weight and the low position of the batteries 13 and 14 stabilize the vehicle so that it cannot be easily turned over. Thus, the present vehicle combines stability and exceptional maneuverability to serve the needs of a wide variety of users, both young and old.

We claim:

1. A vehicle comprising:
   a pair of large diameter ground wheels spaced apart laterally;
   a rigid frame positioned midway between said wheels;
   a single axle for both wheels extending horizontally through said frame;
   a driver's seat on said frame above said axle;
   a pair of electric motors supported by said frame below said axle;
   battery means for powering said motors mounted on said frame below said axle;
   a pair of speed reduction drives, each operatively connecting a respective motor to a corresponding wheel and each comprising:
      a small diameter sprocket on the output shaft of the respective motor;
      a larger diameter bicycle wheel rim rotatably supported horizontally behind said frame;
      a first endless chain extending around said sprocket and said bicycle wheel rim to impart rotation from the sprocket to the wheel rim;
      a small diameter second sprocket coaxial with said bicycle wheel rim and rotatable in unison therewith;
      a third sprocket of larger diameter than said second sprocket rotatably mounted on said axle and rigidly connected to the corresponding wheel;
      and a second endless chain extending around said second and third sprockets to impart rotation to said wheel;
   a caliper brake on each of said bicycle wheel rims for selectively stopping its rotation;
   and a pair of brake operating handles located in front of the driver's seat on opposite sides thereof and each operatively coupled to a corresponding caliper brake for selectively applying that brake.

2. A vehicle according to claim 1, and further comprising:
   a pair of control handles mounted on said frame and extending forward from the driver's seat on opposite sides thereof;
   electrical switches controlling the operation of said motors individually;
   and actuators for said switches on said control handles;
   and wherein said brake-operating handles are mounted on said control handles.

3. A vehicle according to claim 2, wherein each wheel comprises:
   an axially elongated hub located centrally of the wheel;
   a rigid circumferential ring extending circularly around said hub;
   a tire of rubber-like material on the outside of said ring;
   and a plurality of circumferentially spaced cables, each attached at its opposite ends to said hub on opposite sides of said ring in a direction axially of the wheel and each extending from the hub around said ring;

4. A vehicle according to claim 3, wherein:
   each of said cables is wrapped around said ring in the corresponding wheel;
   and further comprising on each wheel:
      a separate cable clamp for each cable acting between said cable and the hub and enabling the tension on that cable to be selectively adjusted.

5. A vehicle according to claim 2, wherein each wheel comprises:
   an axially elongated hub located centrally of the wheel;
   a rigid circumferential ring extending circularly around said hub;
   a tire of rubber-like material on the outside of said ring;
   and a plurality of circumferentially spaced cables, each attached at its opposite ends to said hub on opposite sides of said ring in a direction axially of the wheel and each extending from the hub around said ring;
   and wherein:
      each of said third sprockets is attached to the axially inward end of the corresponding wheel hub.

* * * * *